(12) United States Patent
Ziegler et al.

(10) Patent No.: US 7,961,839 B2
(45) Date of Patent: Jun. 14, 2011

(54) ADVANCED CONVERGENCE FOR MULTIPLE ITERATIVE ALGORITHM

(75) Inventors: Andy Ziegler, Hamburg (DE); Michael Grass, Buchholz In der Nordheide (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 122 days.

(21) Appl. No.: 12/096,911

(22) PCT Filed: Dec. 4, 2006

(86) PCT No.: PCT/IB2006/054577
§ 371 (c)(1),
(2), (4) Date: Jul. 9, 2008

(87) PCT Pub. No.: WO2007/069121
PCT Pub. Date: Jun. 21, 2007

(65) Prior Publication Data
US 2008/0273656 A1    Nov. 6, 2008

(30) Foreign Application Priority Data
Dec. 15, 2005 (EP) ..................... 05112189

(51) Int. Cl.
*A61B 6/00* (2006.01)
(52) U.S. Cl. ............................ 378/19; 378/4
(58) Field of Classification Search ............... 378/4, 18, 378/19
See application file for complete search history.

(56) References Cited

U.S. PATENT DOCUMENTS

| | | | |
|---|---|---|---|
| 3,965,358 A * | 6/1976 | Macovski | 378/5 |
| 4,138,611 A * | 2/1979 | Hounsfield | 378/18 |
| 4,167,039 A | 9/1979 | Kowalsi | |
| 4,352,020 A * | 9/1982 | Horiba et al. | 378/18 |
| 5,708,690 A * | 1/1998 | Hsieh | 378/4 |
| 6,002,739 A * | 12/1999 | Heumann | 378/8 |
| 6,426,988 B2 * | 7/2002 | Yamada et al. | 378/4 |
| 6,507,633 B1 * | 1/2003 | Elbakri et al. | 378/8 |
| 2002/0015476 A1 * | 2/2002 | Reinwand et al. | 378/901 |
| 2002/0048347 A1 * | 4/2002 | Saito | 378/207 |

(Continued)

FOREIGN PATENT DOCUMENTS

EP    0107253 A1    5/1984

(Continued)

OTHER PUBLICATIONS

Gleason et al., Reconstruction of Multi-Energy X-ray Computed Tomography Images of Laboratory Mice, IEEE Transactions on Nuclear Science, vol. 46, No. 4, Aug. 1999 pp. 1081-1086.*

(Continued)

*Primary Examiner* — Edward J Glick
*Assistant Examiner* — Alexander H Taningco

(57) ABSTRACT

Iterative methods for reconstructing of three-dimensional images based on projection data signals obtained by a computer tomography system often result in wrong absorption coefficients in particular for regions including a hollow space of an object under examination. Furthermore iterative methods show a slow convergence for calculating such absorption coefficients. According to embodiments of the present invention there is provided a method for an advanced reconstruction of three-dimensional images based on modified projection data signals. The modification includes an addition of a constant absorption value to the measured projection data. Advantageously the constant absorption value is an absorption line integral through a virtual body having the spatial constant absorption coefficient of water. The virtual body preferably has a volume which is slightly bigger than the object of interest.

20 Claims, 4 Drawing Sheets

U.S. PATENT DOCUMENTS

| | | | |
|---|---|---|---|
| 2002/0106051 A1* | 8/2002 | Menhardt | 378/4 |
| 2003/0156684 A1* | 8/2003 | Fessler | 378/210 |
| 2004/0109528 A1* | 6/2004 | Nukui et al. | 378/19 |
| 2004/0131140 A1* | 7/2004 | Bruder et al. | 378/4 |
| 2004/0174960 A1* | 9/2004 | Hsieh et al. | 378/210 |
| 2004/0228435 A1* | 11/2004 | Russell | 378/18 |
| 2004/0264625 A1* | 12/2004 | Basu et al. | 378/4 |
| 2004/0264626 A1* | 12/2004 | Besson | 378/4 |
| 2005/0008126 A1 | 1/2005 | Juh et al. | |
| 2005/0105679 A1* | 5/2005 | Wu et al. | 378/22 |
| 2005/0147200 A1* | 7/2005 | Nukui | 378/7 |
| 2006/0078182 A1* | 4/2006 | Zwirn et al. | 382/128 |
| 2006/0098857 A1* | 5/2006 | Hawman | 382/131 |
| 2006/0109949 A1* | 5/2006 | Tkaczyk et al. | 378/4 |

FOREIGN PATENT DOCUMENTS

| | | |
|---|---|---|
| FR | 2311358 | 12/1976 |
| JP | 07204197 A1 | 8/1995 |
| WO | 0079302 A1 | 12/2000 |
| WO | 2005009206 A2 | 2/2005 |
| WO | 2005088544 A1 | 9/2005 |

OTHER PUBLICATIONS

Liew et al., Noise propagation in SPECT images reconstructed using an iterative maximum-likelihood algorithm, Phys Med Biol, 38, 1993, pp. 1713-1726.*

Lauritsch, G., et al.; Head Phantom; downloaded May 29, 2008 www.imp.uni-erlangen.de/forbildideutsch/results/head/head.html.

Lange, K., et al.; Globally Convergent Algorithms for Maximum a Posteriori Transmission Tomography; 1995; IEEE Trans. on Image Processing; 4(10)1430-1438.

* cited by examiner

ADVANCED CONVERGENCE FOR MULTIPLE ITERATIVE ALGORITHM

The present invention relates to the field of image reconstruction, for example in medical applications. In particular, the present invention relates to a method for producing or reconstructing an image based on data signals obtained by a computer tomography system comprising a tomography apparatus having a radiation source and a radiation detector. The present invention further relates to a data processing device, a tomography system, a computer-readable medium and a program element for producing an image based on data signals, in particular for producing an image based on data signals obtained by a computer tomography system.

Computed tomography (CT) is a process of using digital processing to generate a three-dimensional image of the internal of an object under examination (object of interest) from a series of two-dimensional X-ray images taken around a single axis of rotation. The reconstruction of CT images can be done by applying appropriate algorithms.

In medical CT highly accurate images with high and isotropic spatial resolution and extremely low noise are required at a minimum of patient dose. Furthermore, CT image reconstruction must be computationally efficient to perform in real time. This can be achieved by using image reconstruction algorithms based on filtered backprojection (FBP) in two or three dimensions or on Fourier reconstruction approaches.

By contrast to these analytic methods there are iterative reconstruction algorithms that view the reconstruction problem from a numerical point of view. They seek to invert the system matrix or to maximize the likelihood of the volume under reconstruction based on the measurement by iterating between spatial domain and projection domain. Their key advantage is the ability to be able to operate at reduced patient dose by accurately modeling the quantum statistics of the scan. These techniques, however, require up to a few hundred iterations to converge sufficiently. Each iteration consists at least of one reprojection and one backprojection of the image and the processed data, respectively. Consequently, one iteration is at least as expensive as two FBP reconstructions.

In WO 2005/088544 A1 there is disclosed a method for reconstructing a CT image by an iterative algorithm, wherein the updates of the iterative algorithm are weighted with an intrinsic statistical error of the measured photon counts. This may lead to an efficient removal of artefacts in the image reconstruction. However, like all state of the art iterative algorithm also this disclosed reconstruction method for three-dimensional images is computationally expensive.

There may be a need for an improved multiplicative iterative algorithm which can operate with reduced computing power.

This need may be met by a method for producing an image based on data signals obtained by a computer tomography system comprising a tomography apparatus having a radiation source and a radiation detector. Further, this need may be met by a data processing device, by a tomography system, by a computer-readable medium and by a program element according to the independent claims.

According to an exemplary embodiment of the present invention there is provided a method for producing an image based on data signals. In particular there is provided a method for producing an image based on data signals obtained by a CT system, which comprises a tomography apparatus having a radiation source and a radiation detector. The method comprises the step of loading the data signals into a data processor; the step of modifying each data signal by adding a constant value and the step of applying an iterative algorithm to the modified data signal until a three-dimensional image of an object under examination is produced. An iterative algorithm usually is an algorithm wherein a plurality of update steps is performed until an end criterion has been fulfilled.

It should be noted that the method might be applied for image reconstruction of data signals which are obtained with any trajectory, detector shape and beam geometry (e.g. fan-beam, cone-beam, etc.).

It may be seen as a gist of the described method that using artificial modified data by adding a constant value to each data signal a reliable image production can be achieved which shows a much faster convergence compared to an image reconstruction based on an evaluation of the original measured and non-modified data signals. Therefore, the production or reconstruction of three-dimensional images can be achieved much faster and/or with significantly reduced computing power.

According to another exemplary embodiment each data signal is a projection data signal acquired by means of a radiation source generating a beam and by means of a radiation detector detecting the beam after the beam has passed the object under examination. Thereby, each data signal represents a projection through the object under examination under a different angle.

According to another exemplary embodiment each projection data signal represents an absorption value caused by the object under examination and the constant value is an absorption line integral through a virtual body having a constant absorption coefficient. In the following the influence of this artificial data modification is described:

When using state of the art iterative algorithm for reconstructing three-dimensional images there might be a multiplicative update of an absorption coefficients μ which is supposed to be evaluated in a selected voxel i of the object under investigation. For a subsequent iteration from a step n to a step n+1 this update can be described in a good approximation with the following formula:

$$\mu_i^{n+1} = \mu_i^n \cdot c, \quad \text{(equation 1)}$$

With such an update an absorption coefficient of μ=0, which is existent in hollow spaces of the object under investigation, can only be achieved if c=0. However, for iterative algorithm for reconstructing three-dimensional images an update formula with c=0 is very unlikely such that the quality of the reconstructed images is corrupt in particular for voxels which are located in a hollow space or which contain material with an absorption coefficient μ which is close to zero.

The addition of a constant value within the volume of the virtual body significantly reduces the influence of the above mentioned update of the absorption coefficient. Therefore, the quality of the reconstructed images may be much better compared to state of the art iterative algorithm in particular for regions with a low or a zero absorption coefficient.

Furthermore, compared to state of the art analytic reconstruction algorithm the described method provides a much better signal to noise ratio. For instance, compared with FBP reconstruction methods the described method provides a signal to noise ratio which is better by a factor of 1.4 at the same spatial resolution.

According to another exemplary embodiment the constant absorption coefficient is equivalent to the absorption coefficient of water. Since the absorption coefficient of water is well known this may provide the advantage that the modification of the data signals can be done in a highly reproducible and accurate way. When using the absorption coefficient of water for artificially shifting all absorption values within the object under examination the minimum absorption coefficient μ is $\mu_{water}$ which is 0.0183 cm$^{-1}$. Therefore, also within hollow spaces within the human body e.g. within the sinus of a head, this minimum absorption coefficient is the basis for the reconstruction of the object under examination.

According to another exemplary embodiment the virtual body has a predefined volume which is smaller than the maximum examination volume of the computer tomography system. This may have the advantage that the constant absorption coefficient may be added only within a region which is slightly bigger than the object of interest. Therefore, the data signals are only increased reasonably. This may cause that the contrast within the modified data signal is not unnecessarily reduced.

According to another exemplary embodiment the predefined volume is bigger than the object under examination and the predefined volume covers all regions of the object under examination. It has to be noted that the object under examination may also be a part of an overall object which is not separable. E.g. the overall object can be the human body of a patient and the object under examination can be the head of the patient.

According to another exemplary embodiment the iterative algorithm is a Maximum Likelihood algorithm. Compared to other reconstruction algorithms the Maximum Likelihood algorithm has the advantage that within a reconstructed image a significant higher signal to noise ratio may be obtained. Therefore, using a Maximum Likelihood algorithm provides the advantage that a comparable image quality can be obtained also with a less intense radiation beam penetrating the object of interest. Due to the higher signal to noise ratio of the Maximum Likelihood algorithm even noisy data signals can lead to high quality images. In this context a noisy data signal is a projection data signal containing only a small number of detector counts for each detector element of a two dimensional spatial resolving detector array which is usually used as the radiation detector. Using noisy data signals has the advantage that the object under examination is exposed to a reduced radiation dose only. This is advantageously in particular when human beings are investigated.

By using a high amount of available information, namely the information of all detected photons collectively, a maximum of information may be derived from a measurement under various observation angles. Thus, the accuracy of a CT system employing the described method may be increased.

According to another exemplary embodiment the production of the image is based on a sub-set of at least two projections of all acquired projections data signals. Such a procedure is usually called an Ordered Subset algorithm. The term "Ordered Subset" means that different projection data from different examination angles are used in a predefined order such that a fast convergence of the reconstructed image may be achieved. This means that the usage of the projection data is not carried out within a sequence comprising data signals representing steadily increasing projection angles. E.g. for image reconstructing the data signals may be used in an order wherein the first projection data represent an examination angle of 0°, the second projection data represent an examination angle of 90°, the third projection data represent an examination angle of 0°+δΘ, the fourth projection data represent an examination angle of 90°+δΘ, the fifth projection data represent an examination angle of 0°+2 δΘ, the sixth projection data represent an examination angle of 90°+2 δΘ and so on. However, it has to be noted that of course also other sequences of examination angles might be applicable. Anyway, image reconstruction on the basis of Ordered Subset Maximum Likelihood algorithm may show an even faster convergence compared to ordinary Maximum Likelihood algorithm.

According to another exemplary embodiment the method further comprises the step of subtracting the constant value from the three-dimensional image such that a final image is obtained. This embodiment may have the advantage that images are produced which may be read in the same way as CT images which are well known for a long time. In that case a person e.g. a health professional who is supposed to read and/or to interpret the final image needs no special training in order to gain all information from images which have been obtained according to the proposed method.

According to another exemplary embodiment of the invention a data processing device is provided. The data processing device comprises a memory for storing data signals of an object of interest, a data processor for producing an image based on the data signals of the object of interest. The data processor is adapted for performing an operation comprising the step of loading the data signals, the step of modifying each data signal by adding a constant value and the step of applying an iterative algorithm to the modified data signal until a three-dimensional image of the object of interest is produced.

Advantageously, this may allow for an accelerated image reconstruction within a CT scanner system and for an improved image quality in particular in regions within the object under examination, which regions include hollow space or a material with a very low absorption coefficient.

According to another exemplary embodiment the iterative algorithm is a Maximum Likelihood algorithm; and the produced image has the highest likelihood. Advantageously, the iterative approach of a Maximum Likelihood algorithm may allow for an improved image with a lower number of artefacts. Furthermore, due to a faster convergence when reconstructing an image high quality images may be obtained much faster compared to data processing device employing state of the art Maximum Likelihood algorithm.

According to another exemplary embodiment of the invention there is provided a tomography system. The tomography system comprises a radiation source which is adapted for emitting a radiation beam, a radiation detector which is adapted for detecting the beam after the beam has passed an object under examination, a memory for storing data signals obtained by the radiation detector and a data processor for producing an image based on the data signals. The data processor is adapted for performing the following operation: loading the data signals, modifying each data signal by adding a constant value and applying an iterative algorithm to the modified data signal until a three-dimensional image of the object under examination is produced. Furthermore, the data processor is adapted to carry out any exemplary embodiment of the above described method.

The radiation source may be a conventional X-ray source, which can either emit a polychromatic or a monochromatic radiation. The radiation detector can be formed of a single radiation sensor, a plurality of radiation sensors or a sensor array.

The tomography system may be applied as a material testing apparatus, a medical application apparatus or any other apparatus for measuring three-dimensional images. The tomography system may also be a coherent scatter computer tomography apparatus, a positron emission tomography apparatus or a single photon emission computer tomography apparatus. Anyway, it should be clear that the present invention is not limited to X-ray computer tomography.

According to another exemplary embodiment of the invention there is provided a computer-readable medium in which there is stored a computer program for producing an image based on data signals, in particular on data signals obtained by a computer tomography system comprising a tomography apparatus having a radiation source and a radiation detector. The computer program, when being executed by a processor, is adapted to carry out exemplary embodiments of the above described method.

According to another exemplary embodiment of the invention there is provided a program element for producing an image based on data signals, in particular on data signals obtained by a computer tomography system comprising a tomography apparatus having a radiation source and a radiation detector. The program element, when being executed by a processor, is adapted to carry out exemplary embodiments of the above described method.

The program element may be written in any suitable programming language, such as, for example, C++ and may be stored on a computer-readable medium, such as a CD-ROM. Also, the computer program may be available from a network, such as the World Wide Web, from which it may be downloaded into image processing units or processors, or any suitable computers.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

The illustration in the drawing is schematically. It is noted that in different drawings, similar or identical elements are provided with same reference signs or with reference signs which are different from each other only within the first digit.

FIG. 1 shows a computer tomography apparatus 100 which is a cone-beam CT scanner. However, the invention may also be carried out with CT scanner comprising a fan-beam geometry.

Figure 1:
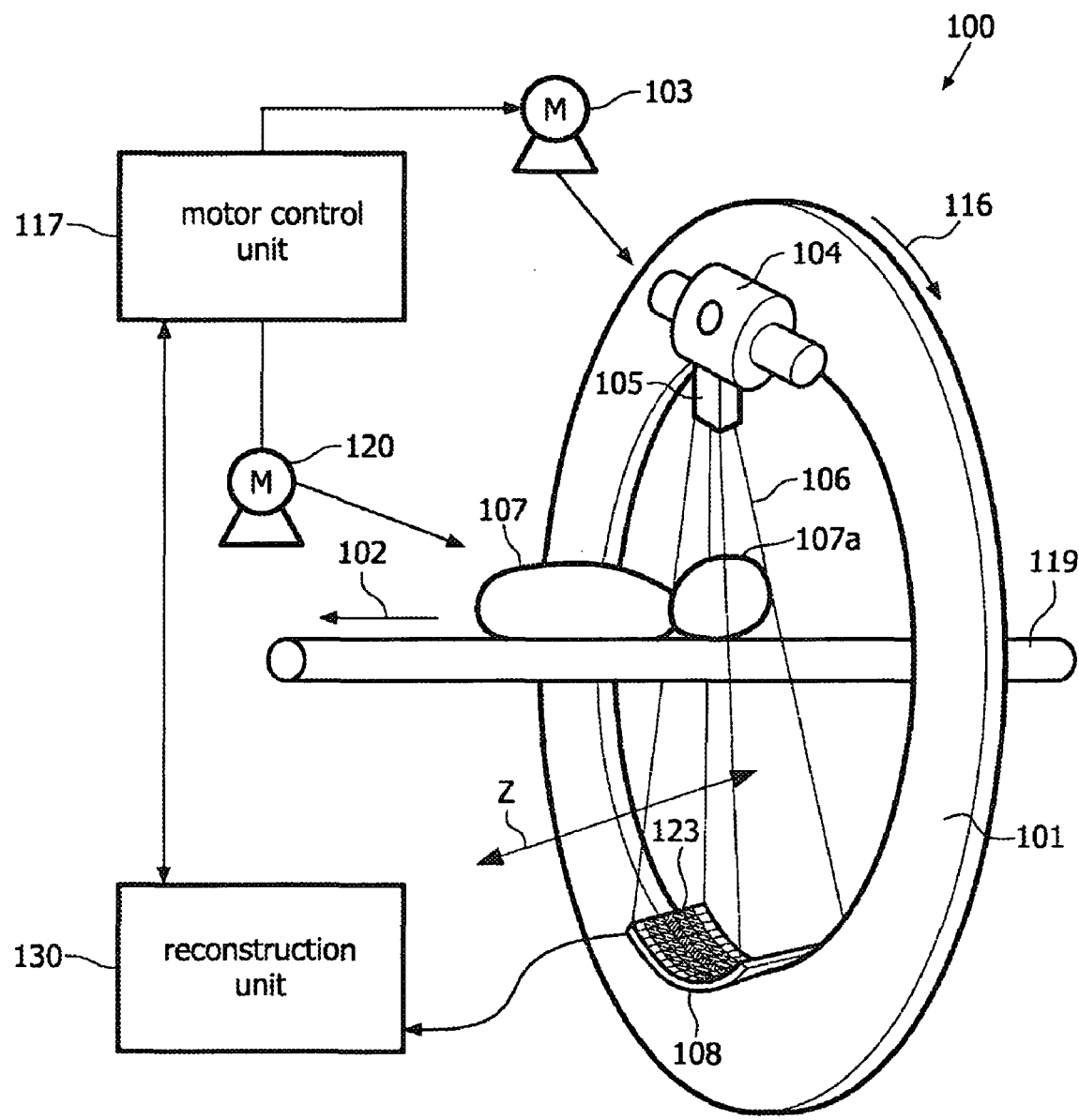
FIG. 1 shows a simplified schematic representation of a computer tomography (CT) system.

The CT scanner 100 comprises a gantry 101, which is rotatable around a rotational axis 102. The gantry 101 is driven by means of a motor 103. Reference numeral 104 designates a source of radiation such as an X-ray source, which, according to an aspect of the present invention, emits polychromatic or monochromatic radiation.

Reference numeral 105 designates an aperture system which forms the radiation beam emitted from the radiation source 104 to a cone-shaped radiation beam 106. The cone-shaped beam 106 is directed such that it penetrates an object of interest 107 arranged in the center of the gantry 101. The center of the gantry 101 represents the examination region of the CT scanner. After penetrating the object of interest 107 the beam 106 impinges onto a detector 108.

As may be taken from FIG. 1, the detector 108 is arranged on the gantry 101 opposite to the source of radiation 104 such that the surface of the detector 108 is covered by the cone beam 106. The detector 108 comprises a plurality of detector elements 123 each capable of detecting X-rays which have been scattered by or passed through the object of interest 107.

During scanning the object of interest 107, the source of radiation 104, the aperture system 105 and the detector 108 are rotated together with the gantry 101 in a direction indicated by an arrow 116. For rotation of the gantry 101 with the source of radiation 104, the aperture system 105 and the detector 108, the motor 103 is connected to a motor control unit 117 which itself is connected to a reconstruction or unit 130 (which might also be denoted as a calculation or a determination unit). Furthermore, the reconstruction unit 130 serves also as a control unit which communicates with the motor control unit 117 in order to coordinate the movement of the gantry 101 with the movement of the table 119.

As can also be seen from FIG. 1, the object of interest 107 is a human body which is disposed on an operation table 119. During the scan of a head 107a of the human body 107, while the gantry 101 rotates around the head 107a, the operation table 119 displaces the human body 107 along a direction parallel to the rotational axis 102 of the gantry 101. This displacement is carried out by a motor 120 such that the head 107a is scanned along a helical scan path. The operation table 119 may also be stopped during the scans to thereby measure slices of the head 107a with high accuracy.

It should be noted that in all of the described cases it is also possible to perform a circular scan, where there is no displacement in a direction parallel to the rotational axis 102, but only the rotation of the gantry 101 around the rotational axis 102.

Further, it shall be emphasized that, as an alternative to the cone-beam configuration shown in FIG. 1, the invention can be realized by a fan-beam configuration. In order to generate a primary fan-beam, the aperture system 105 can be configured as a multi slit collimator.

The detector 108 is coupled to the reconstruction unit 130. The reconstruction unit 130 receives the detection result, i.e. the read-outs from the detector elements 123 of the detector 108 and determines a scanning result on the basis of these read-outs.

Figure 2:
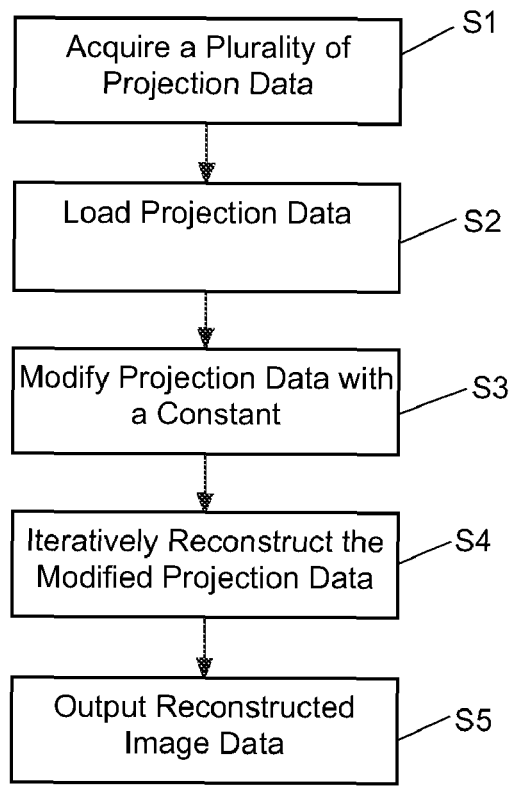
FIG. 2 shows a flow chart on a method for reconstructing a three-dimensional image based on an iterative algorithm.

FIG. 2 shows a flow-chart of an exemplary method according to the present invention for performing a image reconstruction of projection data signals obtained with the computer tomography apparatus 100 shown in FIG. 1. However, it should be noted, that the method may be applied not only to data sets acquired with a CT examination apparatus, but may also be applied to other data sets, which are acquired by other examination apparatuses, such as, for example, positron emission computed tomography systems.

The method starts with step S1 with an acquisition of a plurality projection data which are obtained under different projection angles. For each projection angle, the intensity of electromagnetic radiation emitted by a radiation source and transmitted through an object of interest is measured by a spatially resolving detector array. From the reduction of the measured intensity compared to the intensity which would be measured without an object of interest a plurality of absorption values are obtained. Thereby, each detector element of the detector array provides one absorption value.

It has to be emphasized that the term intensity can also be understood on the basis of quantum theory. In this context the term intensity corresponds to the number of photon counts which impinge onto each detector element forming the detector array. In particular when the examination of the object of interest is carried out with a small radiation dose the measured data contain statistical fluctuation effect due to the photon statistics.

Then, in step S2, the measured plurality of projection data is loaded into a data processor. Since the amount of all projection data is usually high a data processor comprising a central processing unit (CPU) and a memory is used. The memory which is coupled with the CPU is capable for storing all data which are used for the three-dimensional image reconstruction.

Then, in step S3, the loaded data are modified in a way that a constant value is added to the projection data measured with each detector element of the detector array. With CT imaging the projection data represent absorption values caused by the object under examination. Therefore, the constant value is an absorption line integral through a virtual body having a spatially constant absorption.

A preferable value for the added constant absorption coefficient is the absorption coefficient of water. The absorption coefficient of water is well known in a highly reproducible and accurate way. Therefore, all absorption values within the object under examination are shifted by the absorption coefficient of $\mu_{water}$ which is 0.0183 cm$^{-1}$.

In order not to decrease the contrast of the modified projection data unnecessarily the constant absorption coefficient is only added within a predefined volume which is slightly bigger than the object under examination (e.g. the head 107a of the patient 107 depicted in FIG. 1). Thereby, no useless absorption values in a region outside the object of interest but inside the maximum examination volume of the CT scanner are introduced in the modified data.

Then, in step S4, an iterative algorithm is performed on the full set of modified projection data. Preferable a convex Maximum Likelihood algorithm is employed. The Maximum Likelihood Method is able to determine an equation which defines an image with the highest likelihood L($\mu$) by setting $\delta L(\mu_j)/\delta\mu_j=0$, where $\mu$ is the vector of attenuation parameters $\mu_j$. Since this equation is transcendental, it cannot be solved exactly, but an iterative approach can lead to the solution. One of these iterative approaches is the "Convex Algorithm" described in K. Lange and J. A. Fessler, "Globally convergent algorithms for maximum a posteriori transmission tomography", IEEE Trans. Med. Imaging 4, 1430-1450 (1995), which is hereby incorporated by reference. The update for one iterative step is found to be $$\mu_j^{n+1} = \mu_j^n + \mu_j^n \frac{\sum_i l_{ij}\left[d_i e^{-<l_i,\mu^n>} - Y_i\right]}{\sum_i l_{ij} <l_i, \mu^n> d_i e^{-<l_i,\mu^n>}},$$ (equation 2)

where $d_i$ and $Y_i$ are the emitted and observed number of photon counts, respectively, $l_i$ is the vector of basis functions $l_{ij}$ of the $i^{th}$ projection, and $<l_i, \mu>$ is the inner product $\Sigma_j l_{ij}\mu_j$. This update ensures an increasing likelihood in the neighborhood of the optimal point, thus it should lead to an optimal image.

This update from a step n to a step n+1 can be described in a good approximation with the above mentioned equation 1. It is clear that an absorption coefficient of $\mu$=0, which is existent in hollow spaces of the object under investigation, can only be achieved if c=0. However, for iterative algorithms for reconstructing three-dimensional images an update formula with c=0 is very unlikely. Therefore, when a Maximum Likelihood algorithm is applied to unmodified projection data the quality of the reconstructed images is corrupt in particular for voxels which are located in a hollow space within the object of interest.

The usage of the above described modified projection data, wherein the added constant value is an absorption line integral through a virtual body having a spatially constant absorption coefficient, significantly reduces the influence of the update of the absorption coefficient according to equation 1. Therefore, the iterative algorithm applied to the modified data shows a much faster convergence compared to the iterative algorithm applied to unmodified raw projection data. Furthermore, it is believed that also the quality of the reconstructed images in particular for regions with a low or a zero absorption coefficient $\mu$ is much better compared to iterative algorithms which are applied to unmodified raw projection data.

Finally, in step 5, different slices of the reconstructed image are outputted e.g. via a graphical user-interface. This allows a physician to analyze images of arbitrary slices of the object under examination.

Figure 3:
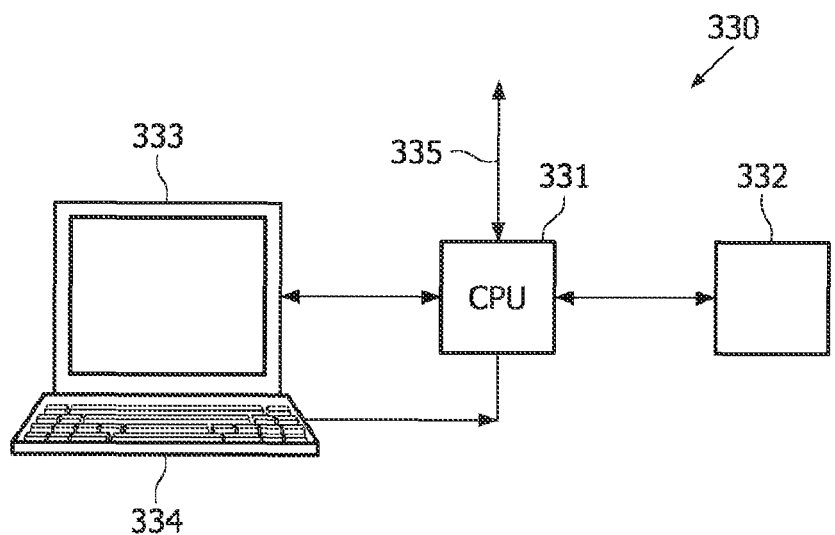
FIG. 3 shows an image processing device for executing an exemplary embodiment of a method in accordance with the present invention.

FIG. 3 depicts an exemplary embodiment of a data processing device 330 according to the present invention for executing an exemplary embodiment of a method in accordance with the present invention. The data processing device 330 comprises a central processing unit (CPU) or image processor 331. The image processor 331 is connected to a memory 332 for storing an image depicting an object of interest, such as a patient or an item of baggage. Via a bus system 335 the image processor 331 is connected to a plurality of input/output network or diagnosis devices, such as a CT device. Furthermore, the image processor 331 is connected to a display device 333, for example, a computer monitor, for displaying information or an image computed or adapted in the image processor 331. An operator or user may interact with the image processor 331 via a keyboard 334 and/or any other output devices, which are not depicted in FIG. 3.

Figure 4A:
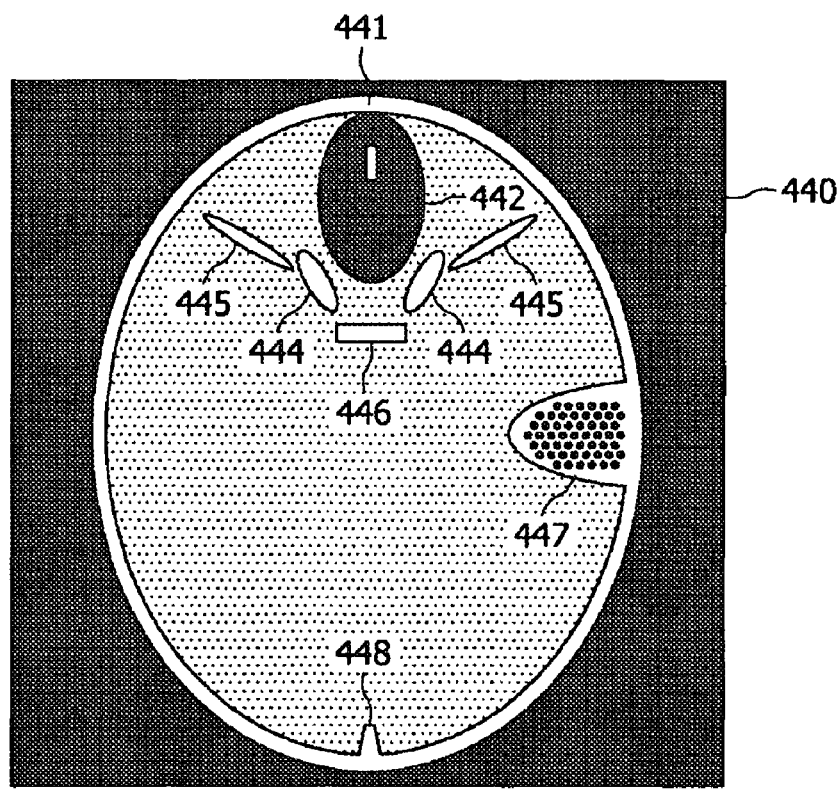
FIG. 4a and FIG. 4b show an image slice of a head phantom.
Figure 4B:
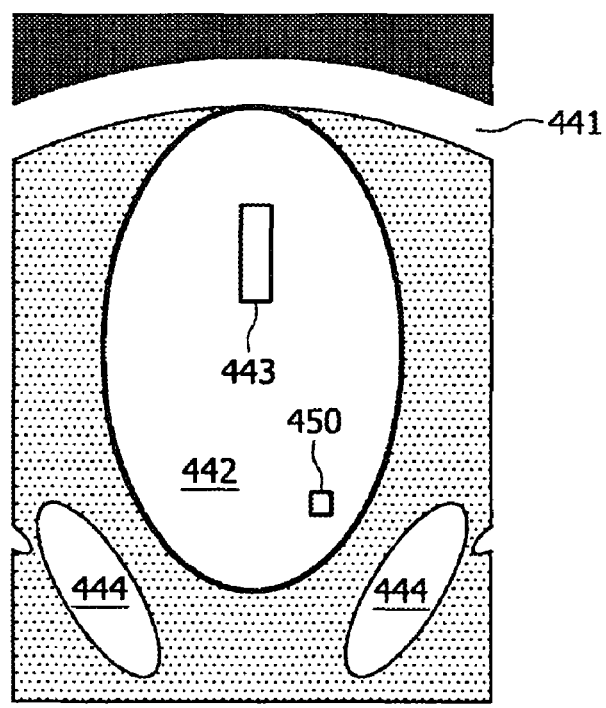

FIG. 4a and FIG. 4b show a image slice of a head phantom 440. FIG. 4b is an enlarged view of the upper central part of FIG. 4a. The head phantom 440 which in the field of CT image reconstruction is well known as the so called forbild head phantom (see http://www.imp.uni-erlangen.de/forbild/deutsch/results/head/head.html) is defined by simple geometric objects like spheres, cylinders, ellipsoids or cones. The head phantom 440 consists of a simple representation of anatomical structures which are important in evaluating CT image quality: Calotte 441, frontal sinus 442 and surrounding bones 443, 444, 445 and 446, inner ear right 447 and internal occipital protuberance 448. Other anatomical structures like the inner ear (left), eyes, homogeneous brain matter and further low contrast objects like ventricle or subdural hematoma cannot be seen in the slice which is shown in FIG. 4a and FIG. 4b.

The frontal sinus 442 represents a hollow space. Therefore, it is clear that the corresponding absorption coefficient $\mu$ within this hollow space is zero. In order to test the quality of a Maximum Likelihood algorithm according to an exemplary embodiment of the present invention a small box 450 within the frontal sinus 442 was selected. The coefficient $\mu_{box}$ within this small box 450 was calculated iteratively using an Ordered Subset Maximum Likelihood algorithm.

The calculation was done in two different ways. A first calculation employed an Ordered Subset Maximum Likelihood algorithm on the basis of measured projection data. A second calculation employed an Ordered Subset Maximum Likelihood algorithm on the basis of modified projection data. The modification included an addition of a constant absorption value to the measured projection data. The constant absorption value is an absorption line integral through a virtual body which itself is a water phantom comprising a spatially constant absorption coefficient $\mu_{water}$. The water phantom has a volume which was on the one hand slightly bigger than the head phantom 440 and which on the other hand included the head phantom 440 completely.

Figure 5:
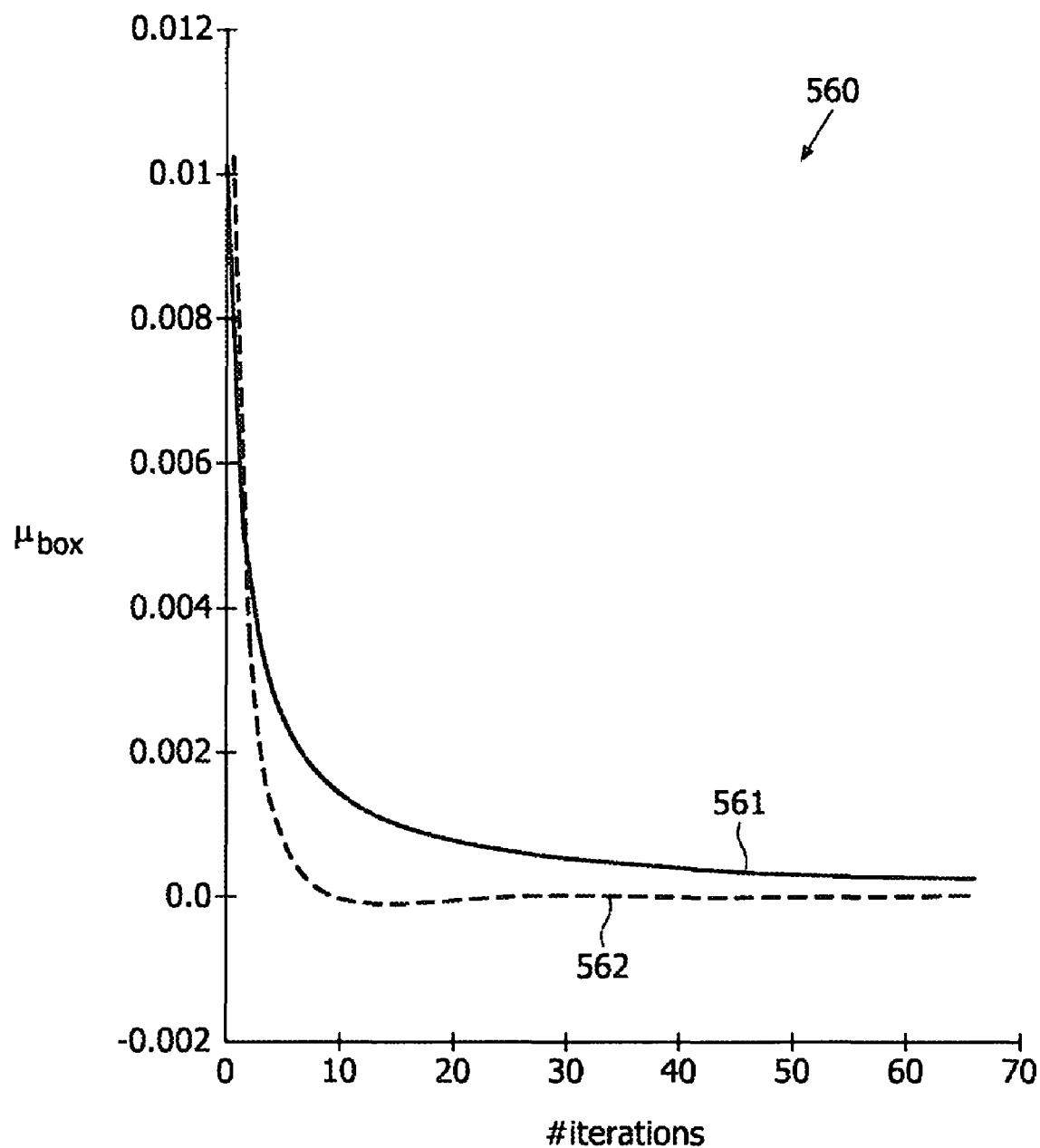
FIG. 5 shows a diagram wherein there is depicted the convergence of two different Maximum-Likelihood algorithms for evaluating the absorption coefficient within a small box located in a hollow space of the head phantom shown in FIG. 4.

FIG. 5 shows a diagram 560 wherein the speed of convergence of the calculated value of the absorption coefficient $\mu_{box}$ within the box 450 is depicted. In the diagram 560 the calculated absorption coefficient $\mu_{box}$ is plotted versus the number of iterations of the respective Ordered Subset Maximum Likelihood algorithm.

Reference numeral 561 designates a curve showing the convergence of the Ordered Subset Maximum Likelihood algorithm on the basis of in total 29 measured (i.e. unmodified) projection data. One can see that the correct absorption coefficient $\mu=0$ is not reached within 67 iteration steps.

Reference numeral 562 designates a curve showing the convergence of the above mentioned Ordered Subset Maximum Likelihood algorithm on the basis in total 29 modified projection data. The modification included the above described addition of a constant absorption value to the measured projection data. In order to directly compare the convergence of the curve 562 with the curve 561 for the plot the absorption coefficient $\mu_{water}$ was subtracted after the calculation of the absorption value $\mu_{box}$ within the box 450 was finished for each iteration step. One can see that compared the curve 561 the curve 562 representing the iterative algorithm on the basis of the modified data converges much faster. Within 10 iterations the correct and final value for the absorption coefficient $\mu_{box}$ is reached.

It has to be emphasized that not only the convergence speed of the curve 562 is much faster than the convergence speed of the curve 561, but also the final value for the absorption coefficient $\mu_{box}$ is much more accurate when the modified projection data are employed for the above mentioned Ordered Subset Maximum Likelihood algorithm. Therefore, both the speed and the quality of the image reconstruction is advanced when using a method according to an embodiment of the present invention.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

In order to recapitulate the above described embodiments of the present invention one can state:

Iterative methods for reconstructing of three-dimensional images based on projection data signals obtained by a computer tomography system often result in wrong absorption coefficients in particular for regions including a hollow space of an object under examination. Furthermore iterative methods show a slow convergence for calculating such absorption coefficients. According to embodiments of the present invention there is provided a method for an advanced reconstruction of three-dimensional images based on modified projection data signals. The modification includes an addition of a constant absorption value to the measured projection data. Advantageously the constant absorption value is an absorption line integral through a virtual body having the spatial constant absorption coefficient of water. The virtual body preferably has a volume which is slightly bigger than the object of interest.

LIST OF REFERENCE SIGNS 100 computer tomography apparatus/CT scanner
101 gantry
102 rotational axis
103 motor
104 radiation source
105 aperture system
106 radiation beam
107 object of interest/object under examination/patient
107a head of patient
108 radiation detector
116 arrow for rotation direction
117 motor control unit
119 table
120 motor
123 detector elements
130 reconstruction unit
S1 step 1
S2 step 2
S3 step 3
S4 step 4
S5 step 5
330 data processing device
331 central processing unit/image processor
332 memory
333 display device
334 keyboard
335 bus system
440 forbild head phantom
441 calotte
442 frontal sinus
443 bone surrounding frontal sinus
444 bones surrounding frontal sinus
445 bones surrounding frontal sinus
446 bone surrounding frontal sinus
447 inner ear right
450 small box
560 diagram
561 Ordered Subset Maximum Likelihood simulation
562 Ordered Subset Maximum Likelihood simulation with a subtraction of a water phantom

The invention claimed is:

1. A method for producing an image based on data signals, comprising:
   loading the data signals into a data processor;
   modifying each data signal by adding a constant value, wherein the constant value is not a beam hardening correction, and wherein the constant value comprises a constant absorption value; and
   applying an iterative algorithm to the modified data signal until a three-dimensional image of an object under examination is produced.

2. The method according to claim 1, wherein each data signal is a projection data signal acquired by a radiation source generating a beam and by a radiation detector detecting the beam after the beam has passed the object under examination.

3. The method according to claim 2, wherein each projection data signal represents an absorption value caused by the object under examination; and the constant value is an absorption line integral through a virtual body having a spatially constant absorption coefficient.

4. The method according to claim 3, wherein the object under examination includes a material with an absorption coefficient similar to an absorption coefficient of bone and the constant absorption coefficient is equivalent to the absorption coefficient of water.

5. The method according to claim 3, wherein the virtual body has a predefined volume which is smaller than a maximum examination volume of a computer tomography system.

6. The method according to claim 5, wherein the predefined volume is bigger than the object under examination; and the predefined volume covers all regions of the object under examination.

7. The method according to claim 2, wherein the production of the image is based on a sub-set of at least two projections of all acquired projection data signals.

8. The method according to claim 2, wherein the constant value is added only to a sub-set of the data signals.

9. The method according to claim 8, wherein the subset corresponds to a volume that is greater than a volume of the object under examination and less than a volume of an examination region traversed by the radiation beam.

10. The method according to claim 1, wherein the iterative algorithm is a Maximum Likelihood algorithm.

11. The method according to claim 1, further comprising:
subtracting the constant value from the three-dimensional image such that a final image is obtained.

12. The method according to claim 1, wherein an accuracy of the iterative algorithm using the modified data signal is greater relative to using the unmodified data signal.

13. The method according to claim 1, wherein a convergence of the iterative algorithm when producing the three-dimensional image of the object using the modified data signal is faster relative to using the unmodified data signal.

14. The method according to claim 1, wherein adding the constant value to the data signals results in modified data signals with non-zero absorption coefficients for data representing hollow spaces an object under examination.

15. The method according to claim 1, wherein adding the constant value to the data signals results in modified data signals that have absorption coefficients greater than a predetermined minimum value.

16. A data processing device, comprising:
a memory for storing data signals of an object of interest, wherein the object of interest includes structure having substantially different attenuation coefficients;
a data processor for producing an image based on the data signals of the object of interest, wherein the data processor is adapted for performing the following operation:
loading the data signals;
modifying each data signal by adding a constant value, wherein the constant value is the attenuation value of water; and
applying an iterative algorithm to the modified data signal until a three-dimensional image of the object of interest is produced.

17. The data processing device according to claim 16, wherein the iterative algorithm is a Maximum Likelihood algorithm; and the produced image has the highest likelihood.

18. A tomography system, comprising:
a radiation source which is adapted for emitting a radiation beam;
a radiation detector which is adapted for detecting the beam after the beam has passed an object under examination;
a memory for storing data signals obtained by the radiation detector; and
a data processor for producing an image based on the data signals, wherein the data processor is adapted for performing the following operation:
loading the data signals;
modifying each data signal by adding a constant value, rendering modified data signals having attenuation values greater than a predetermined non-zero minimum value, and wherein the constant value comprises a constant absorption value; and
applying an iterative algorithm to the modified data signal until a three-dimensional image of the object under examination is produced.

19. A non-transient computer-readable medium in which there is stored a computer program for producing an image based on data signals obtained by a computer tomography system comprising a tomography apparatus having a radiation source and a radiation detector, wherein the computer program, when being executed by a processor, is adapted to carry out the following steps:
loading the data signals into a data processors;
modifying each data signal by adding a constant value, and wherein the constant value comprises a constant absorption value;
applying an iterative algorithm to the modified data signal until a three-dimensional image of an object under examination is produced; and
subtracting the constant value from the three dimensional image.

20. A non-transient computer-readable medium in which there is stored a program element for producing an image based on data signals obtained by a computer tomography system comprising a tomography apparatus having a radiation source and a radiation detector, which program element, when being executed by a processor, is adapted to carry out the following steps:
loading the data signals into a data processor;
modifying each data signal by adding a constant value, wherein the constant value is added only to sub-portions of the data signals corresponding to an object under examination, and wherein the constant value comprises a constant absorption value; and
applying an iterative algorithm to the modified data signal until a three-dimensional image of an object under examination is produced.

* * * * *